(12) United States Patent
Ellson

(10) Patent No.: US 9,739,137 B2
(45) Date of Patent: Aug. 22, 2017

(54) DOWNHOLE TEMPERATURE CALCULATION

(71) Applicant: Vetco Gray Controls Limited, Nailsea Bristol (GB)

(72) Inventor: Nicholas Josep Ellson, Bristol (GB)

(73) Assignee: GE Oil & Gas UK Limited, Nailsea, Bristol (GB)

( * ) Notice: Subject to any disclaimer, the term of this patent is extended or adjusted under 35 U.S.C. 154(b) by 564 days.

(21) Appl. No.: 14/254,108

(22) Filed: Apr. 16, 2014

(65) Prior Publication Data
US 2014/0305637 A1    Oct. 16, 2014

(30) Foreign Application Priority Data

Apr. 16, 2013   (EP) .................................. 13163982

(51) Int. Cl.
*E21B 47/06* (2012.01)
*G01K 11/00* (2006.01)
*G01K 7/42* (2006.01)

(52) U.S. Cl.
CPC ............ *E21B 47/06* (2013.01); *E21B 47/065* (2013.01); *G01K 7/42* (2013.01); *G01K 11/00* (2013.01)

(58) Field of Classification Search
CPC ....... E21B 47/06; E21B 47/065; G01K 11/00; G01K 7/42
USPC ..................................... 16/250.01
See application file for complete search history.

(56) References Cited

U.S. PATENT DOCUMENTS

2007/0199696 A1    8/2007  Walford

OTHER PUBLICATIONS

European Search Report dated Sep. 27, 2013 issued in connection with corresponding EP Application 13163982.5.

*Primary Examiner* — Michael Wills, III
(74) *Attorney, Agent, or Firm* — GE Global Patent Operation

(57) ABSTRACT

A method for calculating a value representative of a downhole temperature in a hydrocarbon well, wherein the well includes production tubing inside an outer tubing, an annulus is provided between the production tubing and the outer tubing, and the annulus receives a hydraulic control line supplying hydraulic fluid for the control of a downhole device, the method including sensing the pressure of hydraulic fluid in the control line at the wellhead, and using a measurement of the pressure to calculate the value representative of the downhole temperature.

6 Claims, 2 Drawing Sheets

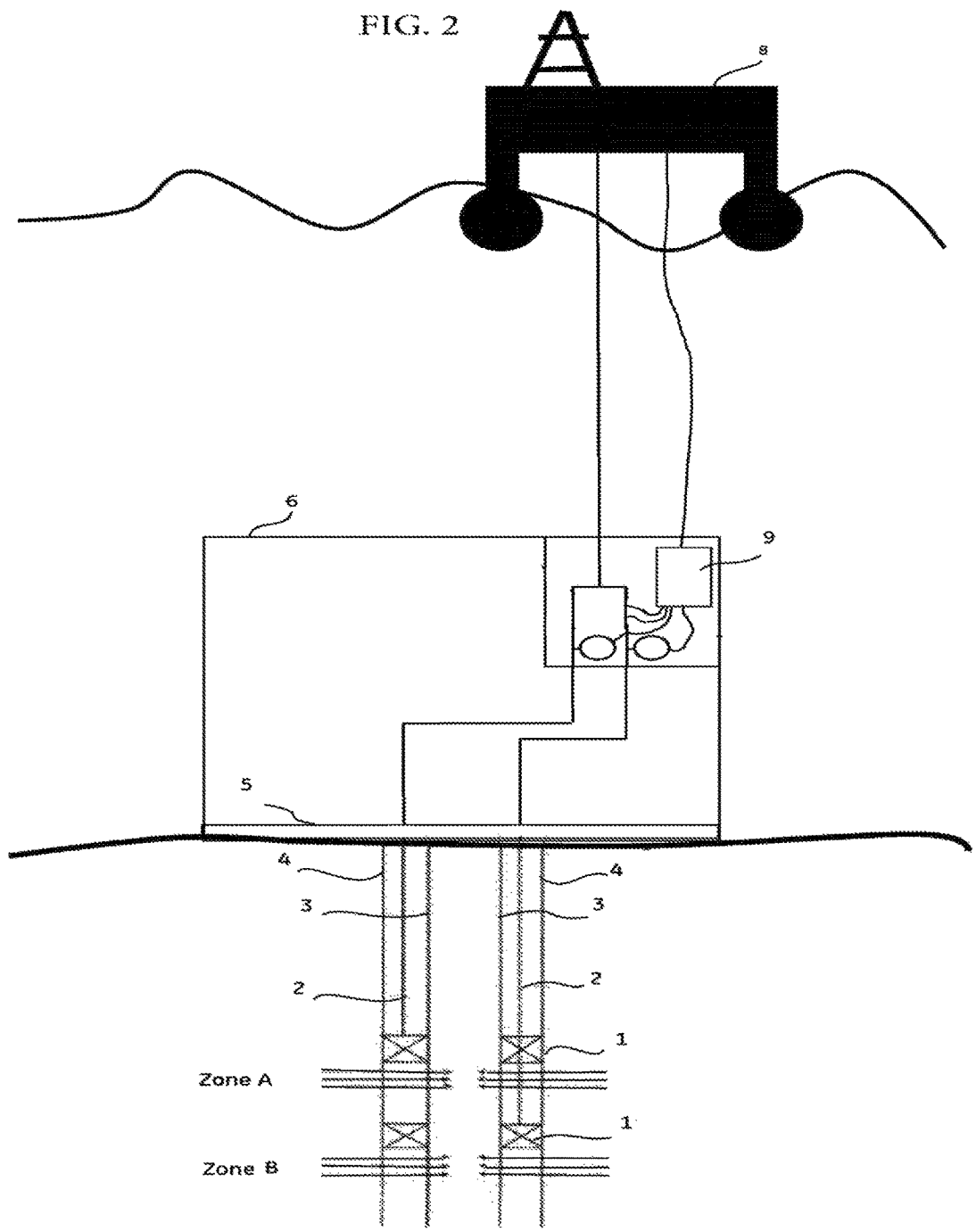

DOWNHOLE TEMPERATURE CALCULATION

BACKGROUND OF THE INVENTION

The present invention relates to calculating a downhole temperature in a hydrocarbon well installation.

The safe and efficient operation of an offshore oil or gas well relies on a knowledge of the reservoir characteristics and the ability to control the flow of fluid from the well. This requires knowledge of the temperatures and pressures at various positions downhole in the well, which enables an operator to control more efficiently, the flow of fluid or gas from the well, and enables reservoir engineers to develop a model or simulation of the reservoir and calculate reserves, etc. The temperature of the reservoir fluid entering the well is also an important measurement, as it allows the operator to detect water or gas breakthrough.

Although the downhole technology is now becoming available for measuring fluid flow, temperature and pressure measurements in offshore oil and gas wells is proving to have poor reliability when operating in the harsh downhole environments of existing wells. With the move to deeper water wells with their harsher downhole environments and higher temperatures (up to 200 degrees C.) and pressures (up to 1000 bar) there is a need to improve measurement reliability. The current sensor technology, providing the required accuracy and resolution, is based on quartz crystals which can survive the harsh environments, but the associated downhole electronics, cables, connectors and communication system that all have poor mean time between failures, in the downhole environment.

Current downhole instrumentation, therefore, does not provide the necessary reliability required for the safe and efficient operation of offshore deepwater wells and there is a need to improve the reliability of downhole temperature and pressure measurements.

The difficulty of using electronics based sensors downhole can be avoided by using distributed fibre-optic sensing techniques which have the intrinsic capability of being more reliable than traditional sensing, in that no downhole electronic equipment is required. However, this technology is currently at an early stage in its operational lifecycle. In any event, using sensors mounted on a Christmas tree located on the seabed, to provide estimates of downhole temperatures and pressures, will provide an essential back-up in the event of failure, for example, of the fibre-optic cable.

SUMMARY OF THE INVENTION

According to an embodiment of the present invention, there is provided a method of calculating a value representative of a downhole temperature in a hydrocarbon well, the well comprising a production tubing inside an outer tubing. An annulus is provided between the production tubing and the outer tubing, which annulus receives a hydraulic control line supplying hydraulic fluid for the control of a downhole device. The method for calculating the downhole temperature according to an embodiment of the present invention comprises sensing the pressure of hydraulic fluid in the control line at the wellhead and calculating the value representative of the downhole temperature using the measurement of pressure.

BRIEF DESCRIPTION OF THE DRAWING

FIG. 2 schematically illustrates a wellhead and a Christmas tree.

DETAILED DESCRIPTION OF THE EXEMPLARY EMBODIMENTS OF THE INVENTION

Figure 1:
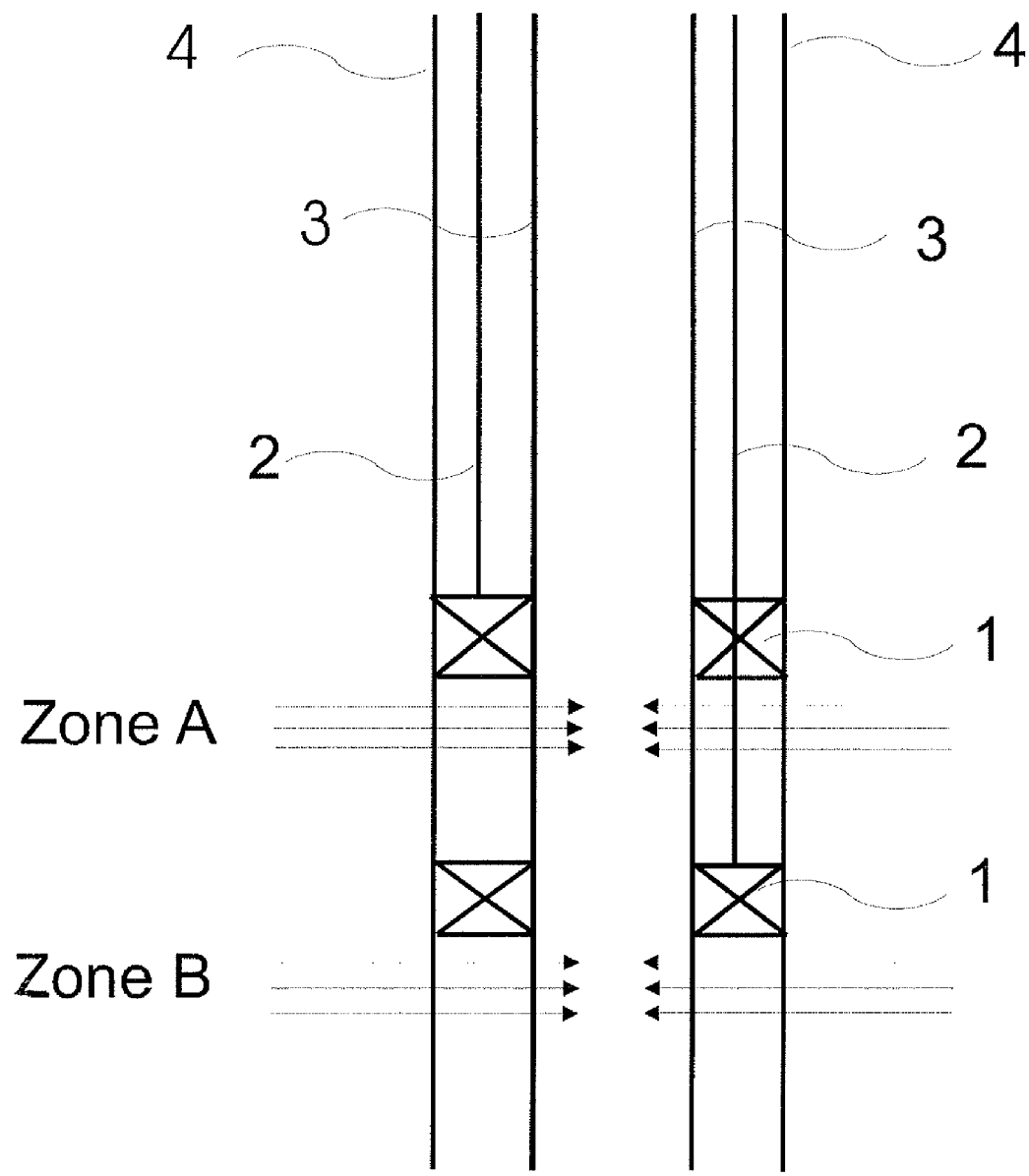
FIG. 1 shows schematically part of a hydrocarbon well installation to which embodiments of the invention may be applied.

Embodiments of the present invention enable a substantial improvement in the reliability of determining the downhole production fluid flow temperature. This is achieved by providing alternative methods that do not require downhole temperature and pressure measurements. The embodiments provide for methods to calculate and infer downhole fluid temperatures by using sensors mounted on a subsea electronic equipment e.g. Christmas trees installed on the seabed. The sensors are installed at the wellhead, avoiding the necessity for downhole sensors. This arrangement provides a major advantage for the operation of well production and sensor back-up.

In order to illustrate the method of calculation of downhole temperatures, a well configuration is shown in FIG. 1. In the example shown in FIG. 1, the well configuration has two zones, Zone A at a depth of 3000 meters and Zone B at a depth of 3100 meters, from which the production fluid can be drawn. Referring to FIG. 1, an interval control valve 1 is fitted at each zone depth, to control the flow of fluid and each has its own hydraulic control line 2. The production fluid flows through the main production tubing 3 whilst chemical cleaning fluids can be passed down the annulus formed between outer tubing 4 and the inner production tubing 3. The annulus also contains the hydraulic control lines 2 which provide for control of the interval control valves 1. As illustrated in FIG. 2, a subsea control module (SCM) for operating directional control valves (DCVs) is disposed at the wellhead 5. The pressure of the hydraulic control lines 2 is measured in the SCM, and the variation in the pressure is used in embodiments of the present invention to infer temperatures further downhole. The calculations necessary to perform the temperature inference may be carried out either in a subsea electronics module (SEM) 9 of the SCM, or, more particularly, at a master control station (MCS) 8 located topside.

In some embodiments, the control lines may have check valves (or pilot operated check valves) included downstream of the pressure measurement (i.e., not between the downhole device and the pressure sensor) to limit the volume of hydraulic fluid in the system that can affect the calculation.

Typically, the temperature at the well head is 340K (degrees absolute) while the temperature at Zone A is 373K. When the production fluid contains water or gas, its temperature will change and this can be detected as a change of pressure in the control lines. More particularly, the temperature of production fluid is sensed at the wellhead 5 and a measurement of that temperature is used to calculate values representative of a downhole temperature. The sensing of temperature may be carried out at a tree 6 at the wellhead 5.

The device could be at a first downhole zone, there being a further downhole device at a second downhole zone with a further control line in the annulus which supplies hydraulic fluid for the control of the further device, the method for calculating the downhole temperature comprising sensing the pressure of hydraulic fluid in the further control line at the wellhead 5 to calculate a value representative of a further downhole temperature. The sensing of pressure could be carried out at a tree 6 at the wellhead 5.

The flow of fluid from a reservoir is controlled by means of hydraulically operated valves (or chokes) positioned within the well, usually at the depths of the various reservoir zones, so that the fluid can be drawn from each zone as required into the main well borehole. The fluid flow is contained within an inner main well bore pipe (production tubing), while the hydraulic control lines for valve operation are contained within an outer annulus surrounding the main production tubing. The annulus also contains chemical fluid which is passed down for cleaning purposes.

The produced fluid, which is at a high temperature, heats the production tubing, which in turn heats the fluid in the annulus. The hydraulic control lines, which are housed in the annulus, are heated along with the annulus fluid. The pressures in the control lines are affected by the temperature and consequently a change in temperature results in a change of pressure.

The pressure of the fluid in a control line can be used to determine the average temperature of that line. When interval control valves (ICVs) are set at different depths, the difference in average temperatures between the lines allows the determination of the average temperature in separate sections of the annulus, hence the temperature of the fluid flowing into the different sections of the well.

When the production fluid contains water or gas, the temperature will change and this can be detected as a change of pressure in the control lines allowing the operator to take necessary controlling actions.

The following analysis illustrates how a hypothetical decrease in temperature of 5K in the fluid flowing from Zone B, due to, e.g. water or gas content of the production fluid, will consequently lead to a measurable change in the pressure in the control lines at the wellhead 5.

| Sensitivity Analysis - Flowing temperature change detection: | |
|---|---|
| $T_{abs\_Z1}$ = 373 K | Absolute temperature at Zone 1 |
| $T_{abs\_WH}$ = 340 K | Absolute temperature at wellhead |
| $T_{av\_1} = \left[\dfrac{(T_{abs\_Z1} - T_{abs\_WH})}{2}\right] + T_{abs\_WH} = 356.5$ K | Average temperature from Zone 1 to wellhead |
| $D_1$ = 3000 m | Measured depth of Zone 1 |
| $D_2$ = 3100 m | Measured depth of Zone 2 |
| $T_{Grd\_1} = \dfrac{(T_{abs\_Z1} - T_{abs\_WH})}{D_1} = 0.011$ K/m | Temperature gradient to Zone 1 |
| $T_{Norm\_2} = (T_{Grd\_1} \cdot D_2) + T_{abs\_WH} = 374.1$ K | Expected temperature at Zone 2 based on temperature gradient |
| $T_{av\_TD\_Norm\_simple} = \left[\dfrac{(T_{Norm\_2} - T_{abs\_WH})}{2}\right] + T_{abs\_WH} = 357.05$ K | Average temperature with normal gradient |
| $T_{WI\_2} = T_{Norm\_2} - 5$ K = 369.1 K | Flowing temperature at Zone 2 with water influx |
| $T_{av\_1\_2\_Norm} = \left[\dfrac{(T_{Norm\_2} - T_{abs\_Z1})}{2}\right] + T_{abs\_Z1} = 373.55$ K | Average temperature between Zones 1 and 2 with normal gradient |
| $T_{av\_1\_2\_WI} = \left[\dfrac{(T_{WI\_2} - T_{abs\_Z1})}{2}\right] + T_{abs\_Z1} = 371.05$ K | Average temperature between Zones 1 and 2 with water ingress at Zone 2 |
| $T_{av\_TD\_Norm} = \left[\left(T_{av\_1} \cdot \left(\dfrac{D_1}{D_2}\right)\right)\right] + \left[T_{av\_1\_2\_Norm} \cdot \left(\dfrac{D_2 - D_1}{D_2}\right)\right] = 357.05$ K | Average temperature with normal gradient (should match simple version above) |
| $T_{av\_TD\_WI} = \left[\left(T_{av\_1} \cdot \left(\dfrac{D_1}{D_2}\right)\right)\right] + \left[T_{av\_1\_2\_WI} \cdot \left(\dfrac{D_2 - D_1}{D_2}\right)\right] = 356.969$ K | Average temperature with water influx |
| $\Delta T = T_{av\_TD\_Norm} - T_{av\_TD\_WI} = 0.081$ K | Change in average temperature of control line going to Zone 2 |
| $\alpha f$ = 0.000207 $K^{-1}$ | Volumetric coefficient of thermal expansion of the fluid |
| $\alpha v$ = 0.000036 $K^{-1}$ | Volumetric coefficient of thermal expansion of control line (= three times the linear one) |
| $\beta$ = 0.0004 $MPa^{-1}$ | Compressibility factor of the fluid (relative change in volume per unit change in pressure) |
| E = 200000 MPa | Elastic modulus |
| D = 8 mm | Diameter of control line |
| t = 2 mm | Thickness of control line |
| $\alpha f \cdot \Delta T = 1.669 \times 10^{-5}$ | Thermal expansion of fluid |
| $\alpha v \cdot \Delta T = 2.903 \times 10^{-6}$ | Thermal expansion of control line |
| $\Delta P = \dfrac{[(\alpha f - \alpha v) \cdot \Delta T]}{\beta + \left(\dfrac{D}{t \cdot E}\right)} = 3.283 \times 10^4$ Pa | |

| Sensitivity Analysis - Flowing temperature change detection: | |
|---|---|
| $\Delta P = 4.762 \cdot \text{Psi}$ | Change in pressure measured at the control line for Zone 2, neglecting annulus pressure changes and flow proportions |
| $\Delta T = \dfrac{\Delta P \cdot \left[\beta + \left(\dfrac{D}{t \cdot E}\right)\right]}{\alpha f - \alpha v}$ | Equation expressed to predict change in temperature for a measured change in pressure. |

As can be seen, this analysis results in an equation from which one may infer the change in the average temperature in a particular zone from a measured change in pressure in the control lines. Some assumptions have been made which are explained in the text but any change in these is unlikely to affect the results significantly.

This derivation of temperatures at the various zones in a well thus provides a basic understanding of the theory behind the proposed method of inferring downhole temperatures by measuring the change in pressure in hydraulic control lines which pass through the various well zones to the fluid control chokes.

When the production fluid contains water or gas, the temperature will change and this can be detected as a change of pressure in the control lines allowing the operator to take necessary controlling actions.

The pressure measuring sensors fitted at the wellhead Christmas tree 6 may need to be of higher resolution in order to measure the change in pressure to the accuracy required, but this is more a cost than an availability issue.

Embodiments of the present invention provide a potential solution for the reliability of determining downhole fluid temperature by providing an alternative method without the need for downhole temperature and pressure measurements. The possibility of being able to estimate the downhole fluid temperature using pressure sensors mounted on a subsea electronic equipment on Christmas trees 6 on the seabed (i.e., avoiding the necessity for downhole sensors) is a major advantage in terms of operational and back-up purposes.

In a complex, multi-completion well with multiple sets of downhole temperature and pressure sensors, failures of some of the sensors could be accommodated by using the absolute measurement from a surviving set of sensors and the pressure measurement in control lines as described previously. If all the downhole sensors fail, then a quantitative measurement would be difficult, but a qualitative indication would be possible to allow identification of which zone is producing water and/or gas.

Overall, the provision of alternative methods of measuring and calculating downhole fluid temperatures can make a significant contribution to providing higher availability/reliability and increased fault tolerance, providing accelerated production profiles, and reducing well intervention frequency to carry out repairs thereby reducing costs and improving overall operational safety conditions.

The move to multilateral and multi-zone wells (which will reduce the number of wellheads, the amount of gas burnt off and risk of oil pollution) will also be assisted by the availability of additional means of downhole fluid temperature estimation.

The written description uses examples to disclose the invention, including the best mode, and also to enable any person skilled in the art to practice the invention, including making and using any device or system and performing the incorporated method. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial difference from the literal language of the claims.

What is claimed is:

1. A method of calculating a value representative of a downhole temperature in a hydrocarbon well, wherein the hydrocarbon well comprises a production tubing inside an outer tubing, an annulus is provided between the production tubing and the outer tubing, and the annulus receives a hydraulic control line supplying hydraulic fluid for the control of a downhole device, the method comprising:
   sensing a pressure of the hydraulic fluid in the hydraulic control line at a wellhead; and
   using the sensed pressure of the hydraulic fluid in the hydraulic control line to calculate the value representative of the downhole temperature.

2. The method according to claim 1, wherein the downhole device is at a first downhole zone, the hydrocarbon well further comprises an additional downhole device at a second downhole zone, and the annulus further receives an additional hydraulic control line supplying hydraulic fluid for the control of the additional downhole device, the method further comprising:
   sensing a pressure of the hydraulic fluid in the additional hydraulic control line at the wellhead to calculate the value representative of the downhole temperature.

3. The method according to claim 2, wherein the sensing of the pressure of the hydraulic fluid in the additional hydraulic control line is carried out at a tree at the wellhead.

4. The method according to claim 1, wherein the sensing of the pressure of the hydraulic fluid in the hydraulic control line is carried out at a tree at the wellhead.

5. The method according to claim 1, further comprising:
   sensing a temperature of a production fluid at the wellhead; and
   using the sensed temperature of the production fluid to calculate the value representative of the downhole temperature.

6. The method according to claim 5, wherein the sensing of the temperature of the production fluid is carried out at a tree at the wellhead.

\* \* \* \* \*